United States Patent
Martinez Bauza et al.

(10) Patent No.: US 8,102,849 B2
(45) Date of Patent: Jan. 24, 2012

(54) ASSOCIATION PROCEDURE TO ENABLE MULTIPLE MULTICAST STREAMS

(75) Inventors: Judit Martinez Bauza, San Diego, CA (US); Krishnan Rajamani, San Diego, CA (US); Soham Sheth, San Diego, CA (US); Samir S. Soliman, San Diego, CA (US); Fawad Shaukat, San Diego, CA (US); Huey Trando, San Diego, CA (US); Dinesh Dharmaraju, San Diego, CA (US); Soumya Das, San Diego, CA (US)

(73) Assignee: QUALCOMM, Incorporated, San Diego, CA (US)

(*) Notice: Subject to any disclaimer, the term of this patent is extended or adjusted under 35 U.S.C. 154(b) by 312 days.

(21) Appl. No.: 12/370,386

(22) Filed: Feb. 12, 2009

(65) Prior Publication Data

US 2010/0202453 A1 Aug. 12, 2010

(51) Int. Cl.
*H04L 12/28* (2006.01)
*H04L 12/56* (2006.01)

(52) U.S. Cl. ...................................... 370/390

(58) Field of Classification Search .................. None
See application file for complete search history.

(56) References Cited

U.S. PATENT DOCUMENTS

| | | | |
|---|---|---|---|
| 4,791,554 A | 12/1988 | Hirota et al. |
| 5,835,723 A | 11/1998 | Andrews et al. |
| 5,925,137 A | 7/1999 | Okanoue et al. |
| 6,049,549 A | 4/2000 | Ganz et al. |
| 6,424,626 B1 | 7/2002 | Kidambi et al. |
| 6,760,772 B2 | 7/2004 | Zou et al. |
| 6,917,976 B1 | 7/2005 | Slaughter et al. |
| 7,477,659 B1 | 1/2009 | Nee et al. |
| 7,519,470 B2 | 4/2009 | Brasche et al. |
| 7,719,972 B2 | 5/2010 | Yuan et al. |
| 2004/0103282 A1 | 5/2004 | Meier et al. |
| 2004/0214571 A1 | 10/2004 | Hong |
| 2005/0096086 A1 | 5/2005 | Singamsetty |
| 2005/0130611 A1 | 6/2005 | Lu et al. |
| 2005/0138193 A1 | 6/2005 | Encarnacion et al. |

(Continued)

FOREIGN PATENT DOCUMENTS

EP 1206080 A1 5/2002

(Continued)

OTHER PUBLICATIONS

International Search Report, PCT/US2010/023834, International Searching Authority, European Patent Office, Jul. 12, 2010.

(Continued)

*Primary Examiner* — Ayaz R Sheikh
*Assistant Examiner* — Blanche Wong
(74) *Attorney, Agent, or Firm* — Ashish L. Patel; Ramin Mobarhan

(57) ABSTRACT

A method, system and computer program product for a wireless mobile display digital interface (WMDDI) association procedure that allows establishing and joining more than one multicast group to facilitate the interoperability of multiple client devices based on host and client capabilities. The protocol provides for the exchange and update of capabilities and multicast addresses for layered multicast transmission applications. The system is used for interoperating devices with different capabilities and provides for efficient transmissions by using different multicast addresses mapped to different layers of a bitstream. The protocol adapts to changes in capabilities, in joining/releasing of multicast addresses and in link quality.

63 Claims, 8 Drawing Sheets

U.S. PATENT DOCUMENTS

| | | | |
|---|---|---|---|
| 2005/0176429 A1 | 8/2005 | Lee et al. | |
| 2005/0184993 A1 | 8/2005 | Ludwin et al. | |
| 2005/0266798 A1 | 12/2005 | Moloney et al. | |
| 2006/0198448 A1 | 9/2006 | Aissi et al. | |
| 2006/0199537 A1 | 9/2006 | Eisenbach | |
| 2006/0218298 A1 | 9/2006 | Knapp et al. | |
| 2006/0233191 A1 | 10/2006 | Pirzada et al. | |
| 2006/0256851 A1 | 11/2006 | Wang et al. | |
| 2006/0288008 A1 | 12/2006 | Bhattiprolu et al. | |
| 2007/0008922 A1 | 1/2007 | Abhishek et al. | |
| 2007/0057865 A1 | 3/2007 | Song et al. | |
| 2007/0141988 A1 | 6/2007 | Kuehnel et al. | |
| 2008/0031210 A1 | 2/2008 | Abhishek et al. | |
| 2008/0045149 A1* | 2/2008 | Dharmaraju et al. | 455/39 |
| 2008/0232402 A1 | 9/2008 | Higuchi et al. | |
| 2008/0273485 A1 | 11/2008 | Tsigler et al. | |
| 2009/0252130 A1* | 10/2009 | Sheth et al. | 370/338 |
| 2010/0172320 A1 | 7/2010 | Suzuki | |

FOREIGN PATENT DOCUMENTS

| | | |
|---|---|---|
| EP | 1233326 A2 | 8/2002 |
| EP | 1653678 A2 | 5/2006 |
| EP | 1944946 | 7/2008 |
| EP | 2012461 | 1/2009 |
| EP | 2037683 | 3/2009 |
| JP | 2002262341 A | 9/2002 |
| JP | 2003143237 A | 5/2003 |
| JP | 2004505531 A | 2/2004 |
| JP | 2004531916 | 10/2004 |
| TW | I239179 | 9/2005 |
| TW | 496058 | 7/2002 |
| TW | I234954 | 6/2005 |
| WO | WO0210942 | 2/2002 |
| WO | WO0249314 A2 | 6/2002 |
| WO | WO2005122509 | 12/2005 |
| WO | WO2007000757 | 1/2007 |
| WO | WO2007021269 | 2/2007 |

OTHER PUBLICATIONS

Written Opinion, PCT/US2010/023834, International Searching Authority, European Patent Office, Jul. 12, 2010.

Dorot, V., et al., "An Explanatory Dictionary of Modern Computer Terms," 2nd Edition, bhv, Saint Petersburg, 2001, 'Program Product' on p. 339.

Euihyeok Kwon, et al., "An idle timeslot reuse scheme for IEEE 802.15.3 high-rate wireless personal area networks" Vehicular Technology Conference, 2005. VTC-2005-Fall. 2005 IEEE 62nd Dallas, TX, USA Sep. 25-28, 2005, Piscataway, NJ, USA, IEEE, Sep. 25.

Helmy A: "Architectural framework for large-scale multicast in mobile ad hoc networks" Proceedings of IEEE International Conference on Communications—Apr. 28-May 2, 2002—New York, NY, USA, IEEE, Piscataway, NJ, USA LNKDDOI: 10.1109/ICC.2002. 997206, vol. 4, Apr. 28, 2002, pp. 2036-2042, XP010589844 ISBN: 978-0-7803-7400-3.

IEEE 802.15.3, "Part 15.3: Wireless Medium Access Control (MAC) and Physical Layer (PHY) Specifications for High Rate Wireless Personal Area Networks (WPANs)," IEEE Computer Society, 2003.

McKnight et al. (TPRC 30th Research Conference on Communication, Information and Internet Policy, Aug. 2002) Virtual Markets in Wireless Grids: Peering Policy Obstacles, hereinafter referred as McKnight, pp. 1 and 20.

Miller B., et al., "Mapping salutation architecture APIs to Bluetooth service discovery layer," Bluetooth White Paper, [Online} pp. 1-25, Jul. 1, 1999, XP002511956.

Myers, et al: "Collaboration Using Multiple PDAS Connected To a PC," Proceedings of the ACM Conference on Computer Supported Cooperative Work (CSCW), Nov. 14, 1998, pp. 285-294, ISBN: 978-1-58113-009-6.

Nordbotten, N.A. et al., "Methods for service discovery in Bluetooth scatternets," Computer Communications, Elsevier Science Publishers BV, Amsterdam, NL, vol. 27, No. 11, Jul. 1, 2004, pp. 1087-1096, XP004503638.

ZhanpingYin et al: "Third-party handshake protocol for efficient peer discovery in IEEE 802.15.3 WPANs" Broadband Networks, 2005 2nd International Conference on Boston, MA Oct. 3-7, 2005, Piscataway, NJ, USA IEEE, Oct. 3, 2005, pp. 902-911, XP010890303.

* cited by examiner

US 8,102,849 B2

ASSOCIATION PROCEDURE TO ENABLE MULTIPLE MULTICAST STREAMS

REFERENCE TO CO-PENDING APPLICATIONS FOR PATENT

The present Application for Patent is related to the following co-pending U.S. Patent Applications:

"Wireless Architecture for a Traditional Wire-Based Protocol", Ser. No. 11/264,642, filed Jan. 18, 2007;

"Wireless Architecture for a Traditional Wire-Based Protocol", Ser. No. 11/624,634, filed Jan. 18, 2007;

"Wireless Architecture for a Traditional Wire-Based Protocol", Ser. No. 12/179,411, filed Jul. 24, 2008;

"Apparatus and Methods for Establishing Client-Host Associations Within a Wireless Network", Ser. No. 12/098,025, filed Apr. 4, 2008; and "NEGOTIABLE AND ADAPTABLE PERIODIC LINK STATUS MONITORING", Ser. No. 12/370,398, filed on evendate herewith.

BACKGROUND

1. Field

The presently claimed invention relates generally to communication systems, and more specifically to associating multicast groups to facilitate the interoperability of multiple client-devices based on host and client capabilities.

2. Background

The Wireless Mobile Digital Display Interface (WMDDI) is an extension of the MDDI Standard to wireless networks, as disclosed in U.S. Pat. No. 6,760,772 and related patent applications. The WMDDI protocol supports a secure data exchange between one host-device, such as a mobile device such as a cell-phone or a personal digital assistant (PDA), and a wide range of simultaneously accessible client-devices, such as wireless displays with embedded capabilities (such as audio/video decoding and reproduction, or HID capabilities). Direct communication between client-devices is not supported; only client to host and host to client asymmetric communications are supported. The communication is asymmetric in the sense that a much larger amount of data is expected to be exchanged in the forward link, that is, from the host to the client.

A WMDDI system consists of a single host-device and one or more client-devices with whom the host-device is able to establish an association and secure communication.

The number of clients is constrained by interoperability of the devices in the system. This interoperability depends on several factors such as:

bandwidth/delay requirements of the multimedia application;

requirements and capabilities of the client-devices because clients may have different processing capabilities, storage capabilities, display resolution and refresh rate capabilities, quality of service (QoS) requirements, etc.;

channel conditions, because interference may cause degradations, simultaneous access-requests from multiple devices may cause delays, etc.;

lower-layer capabilities; and other related factors.

An example of an application that benefits from the creation of several multicast groups is scalable video coding. In scalable coding, every layer would be mapped to a multicast address. For example, a meeting where a video presentation has to be sent to personal display devices (personal computers or cell phones) each with different display resolutions. If the host device is running an application able to provide scalable video coding and the client devices also support scalable video coding, it is possible to efficiently broadcast the video content instead of sending the content unicast. To do so, clients with similar scalability properties, such as same resolution, will be part of a particular multicast group. There may be as many multicast groups as different resolution displays; for example, one multicast group could target quarter common intermediate format (QCIF) resolution and another video graphic array (VGA) resolution. All QCIF devices would be part of the QCIF-multicast-group and all VGA devices would be part of the VGA-multicast-group and the QCIF-multicast-group. The host would broadcast the base layer of the compressed video stream to the QCIF-multicast-address (both QCIF and VGA devices would be able to receive it), and the enhancement layer of the compressed video to the VGA-multicast-address (only VGA devices would be able to receive it). Another use of scalability may be to adapt video broadcast to several QoS based on SNR scalability.

There is, therefore, a need in the art for an association procedure that allows establishing/joining several multicast groups to facilitate the interoperability of multiple client-devices based on host and client capabilities.

SUMMARY

Aspects disclosed herein address the above stated needs by providing methods, systems and computer program products that establish and update the association between a host and at least one client for the transmission of multimedia content to at least one multicast group in a communication system.

Disclosed are two options to enable the transmission of multilayer multimedia content using multiple multicast groups. The first option provides the means for establishing an association that enables this transmission; the second option provides the means for updating an association to enable this transmission. Additionally, a mechanism to update the selection of multicast addresses assigned to multicast groups is also disclosed.

The first option comprises the set of messages and parameters to be used for the establishment of an association that enables the transmission of multilayer multimedia content using multiple multicast groups. A host-initiated association process consists of the following steps. The Host sends a Host Association Request message indicating its intent to associate with the Client. This message includes the Host Association Capabilities, such as security attributes, multicast attributes, link status periodicity and other parameters related to the type of association. This message is only sent when the association process is host-initiated. As a response to this message, or in a client-initiated association process, the Client sends a Client Association Request message indicating its intent to associate. This message includes the Client Association Capabilities, such as security attributes, multicast attributes, link status periodicity and other parameters related to the type of association. A Host Association Confirm message is sent by the Host to the Client; this message contains the Selected Association Capabilities and a Base Multicast Address. Security, multicast, link periodicity and association type options are negotiated at this point, that is, both Host and Client know the type of association to establish, whether or not the communication will be secure, whether or not multicast will be used for sending data to Client and the periodicity for the exchange of link status messages; all this is part of the Selected Association Capabilities. Client and Host Subscribe the Base Multicast Address. The Host assigns a client ID that identifies the Client for this particular session and will remain constant for the duration of the association state. The Client sends a Client Association Confirm message to the Host. This message contains the Subscribed Multicast Addresses. At this point the association has been established and both client and host transition to the associated state. Several variations of these mechanisms are described. Although these variations comprise the same exchange of messages, include all the parameters described, additional parameters can be included in the messages for each of the variations.

The second option enhances the association by providing a means for updating an association to enable the transmission of multilayer multimedia content using multiple multicast groups. After a basic association process, that is, an association process that does not take into account any multilayer capabilities, Host and Client transition to the Associated State. In this state, the Client sends to the Host a Client Device Capabilities message that includes layering capabilities. The Host selects at least one Additional Multicast Address, based on the Client Device Capability Information and sends an Update Multicast Address containing at least one Additional Multicast Address message to the client. Both the Host and the Client Subscribe to the Additional Multicast Addresses. The Client sends an Update Multicast Confirm message that includes the Subscribed Multicast Addresses. At this point, the Host can initiate the transmission of Layered Multimedia Content to the Client at any time.

The mechanism to update the selection of multicast addresses assigned to multicast groups, during the associated state, can be either host or client initiated. In a host-initiated process, the Host sends an Update Multicast Address message containing at least one Selected Additional Multicast Address. The Selected Additional Multicast Address parameter should include the already subscribed multicast addresses and new multicast addresses if selected. Each multicast address should be marked as 'subscribe' or 'unsubscribe'. Both Host and Client Update Subscription to Multicast Address by subscribing or unsubscribing multicast addresses, according to how they are marked. The Client sends an Update Multicast Confirm message containing the Subscribed Multicast Addresses. At this point the multicast groups have been updated and are ready for the transmission of Layered Multimedia Content. If the update is client-initiated, the Client is the one sending the Update Multicast Address message, and the Host responds by sending the Update Multicast Confirm message, following the same rules as described for the host-initiated update. The steps involved in this updating process may take place at any-time during a session, while Host and Client are in an associated state.

The mechanisms described above provide a protocol for the exchange and update of capabilities and multicast addresses for layered multicast transmission applications. It solves not only the problem of interoperating devices with different capabilities in a wireless system, but also provides an efficient transmission mechanism, because of the use of different multicast addresses mapped to different layers of a bitstream. Transmitting to a reduced number of multicast addresses is more efficient than transmitting to several clients unicast. The protocol also provides mechanisms to adapt to changes in the system/channel by updating capabilities, joining/releasing multicast addresses and monitoring the link quality. This may be useful for QoS adaptation. For example, deterioration in the channel due to bandwidth constraints may be mitigated by removing the use of enhancement layers mapped to a certain multicast address. If, at some point, the client has more processing resources available it may update its capabilities and inform the host, who may decide to update the multicast groups this client belongs to, and from now on, the client will be able to receive/process enhancement layers, resulting in a better link quality.

DETAILED DESCRIPTION

The word "exemplary" is used herein to mean "serving as an example, instance, or illustration." Any aspect described herein as "exemplary" is not necessarily to be construed as preferred or advantageous over other aspects. Although the description below describes the claimed invention in steps, the description is meant to include a description of a system and a storage medium with computer-executable program instructions to accomplish similar results as the defined steps.

There are several variations of the mechanisms that facilitate the creation of multiple multicast groups to handle layered transmission of multimedia content. These variations are exemplified in the diagrams of FIGS. 1, 2, 3, and 4. The steps of the process are chronologically presented in each figure, from the top to the bottom. Although only a single client is shown, several clients can be utilized.

Figure 1:
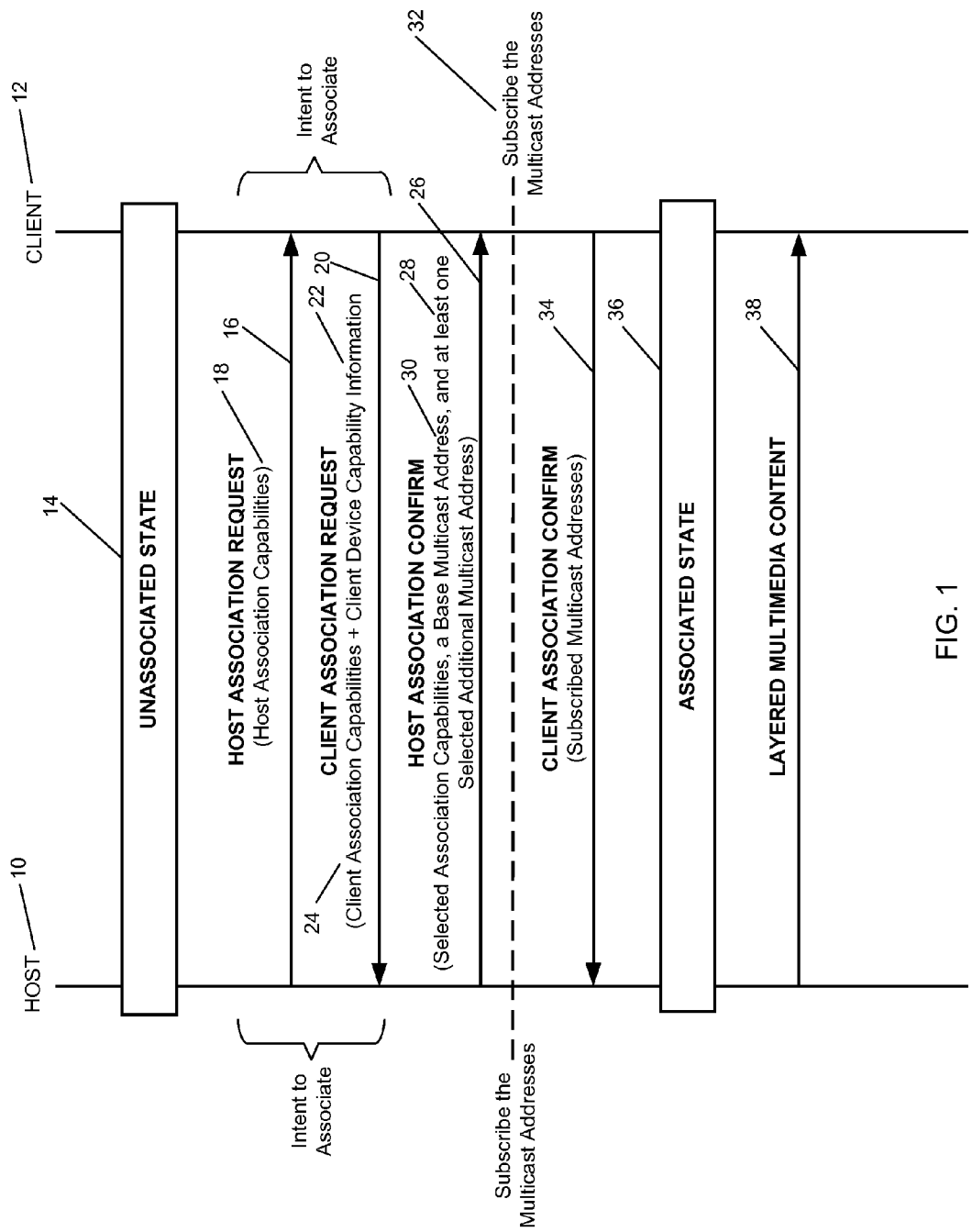
FIG. 1 is a diagram showing the host initiated association aspect for the WMDDI association protocol, wherein the host selects the additional multicast addresses.
Figure 2:
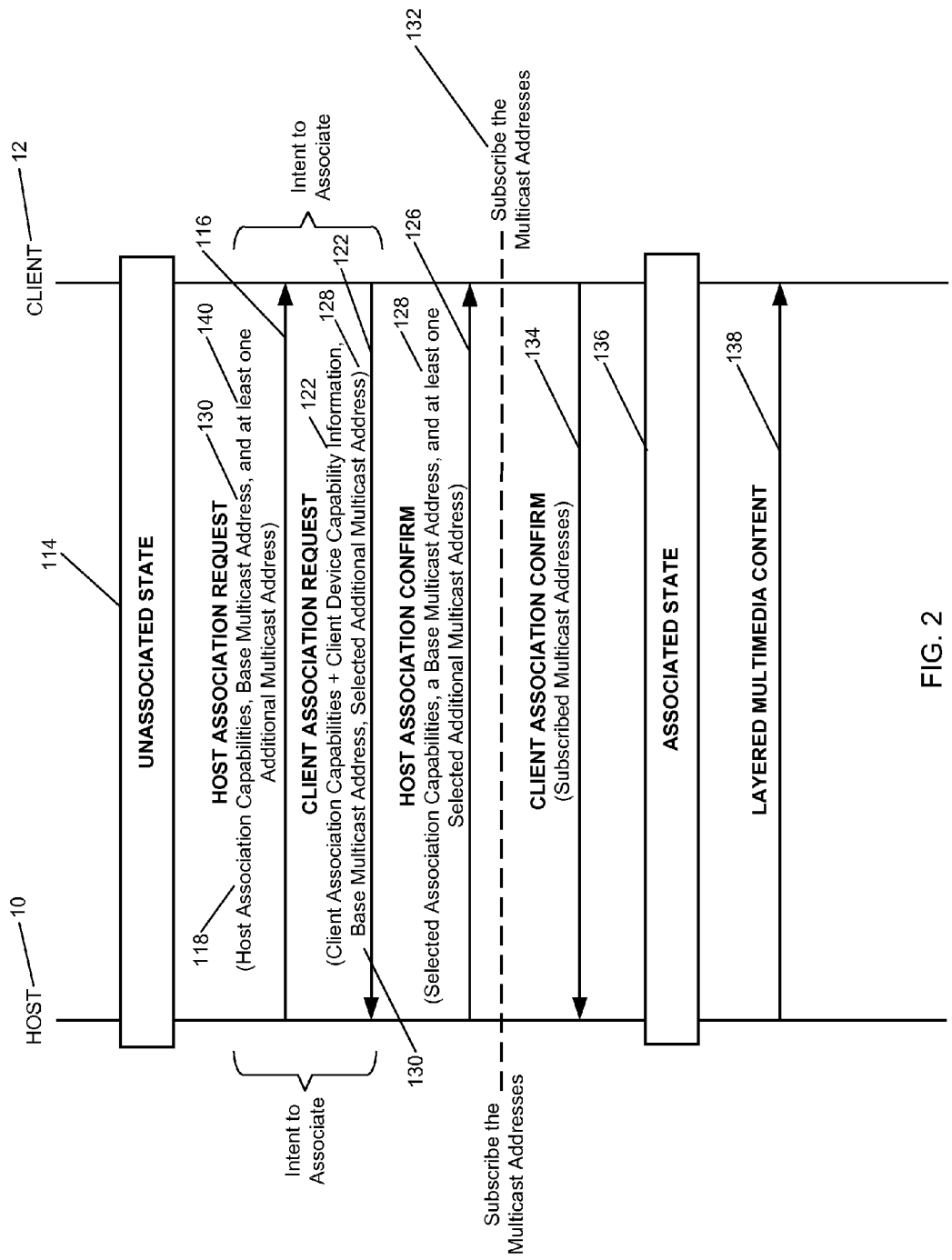
FIG. 2 is a diagram showing the host initiated association aspect for the WMDDI association protocol, wherein the client selects the additional multicast addresses.
Figure 3:
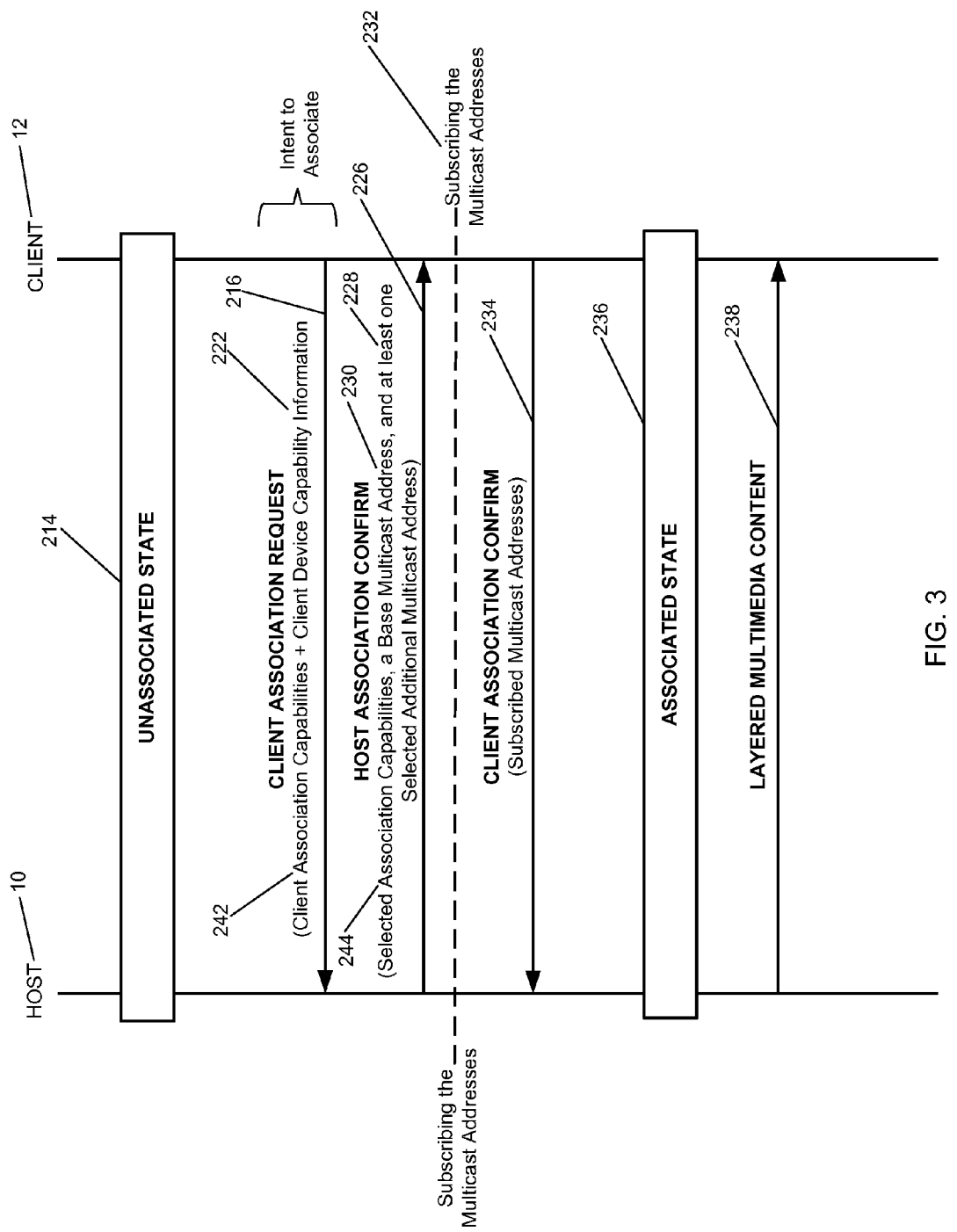
FIG. 3 is a diagram showing the client initiated association process for the WMDDI association protocol.
Figure 4:
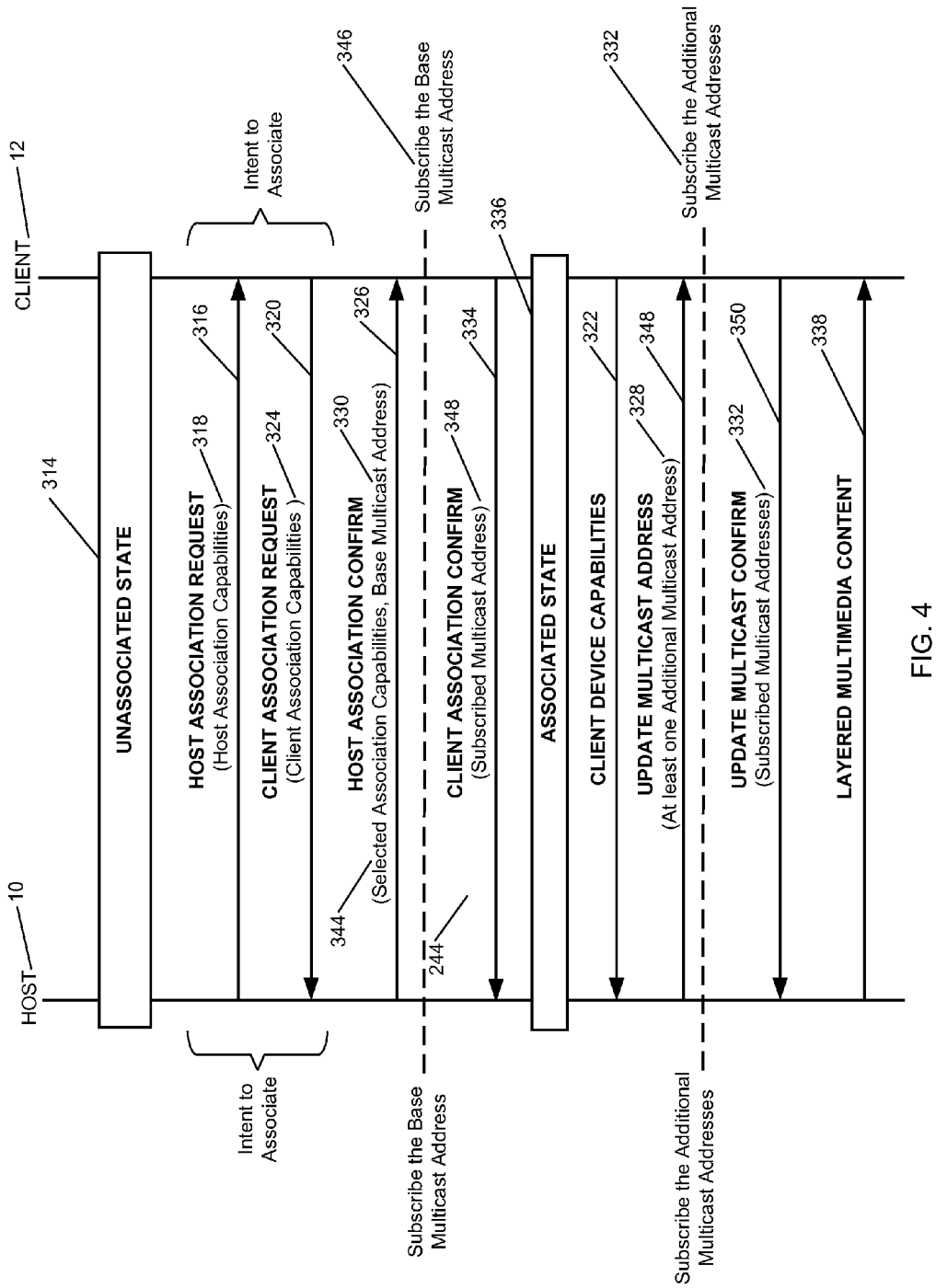
FIG. 4 is a diagram showing the host initiated association process for the WMDDI association protocol.

In a host-initiated association process, as shown in FIGS. 1, 2, and 4, the Host sends a Host Association Request message indicating its intent to associate with the Client. This message includes the Host Association Capabilities, such as security attributes, multicast attributes, link status periodicity and other parameters related to the type of association. This message is only sent when the association process is host-initiated. As a response to this message, or in a client-initiated association process, as shown in FIG. 3, the Client sends a Client Association Request message indicating its intent to associate. This message includes the Client Association Capabilities, such as security attributes, multicast attributes, link status periodicity and other parameters related to the type of association. A Host Association Confirm message is sent by the Host to the Client that includes the Selected Association Capabilities and Base Multicast Address. Security, multicast, link periodicity and association type options are negotiated by this point, that is, both Host and Client know the type of association to establish, whether or not the communication will be secure, whether or not multicast will be used for sending data to Client and the periodicity for the exchange of link status messages. Client and Host then Subscribe to the Multicast Addresses, in particular, to the Base Multicast Address. The Host assigns a client ID that identifies Client for this particular session and will remain constant for the whole duration of the association state. The Client sends a Client Association Confirm message to the Host. This message contains the Subscribed Multicast Addresses.

Although the messages, parameters and actions described so far are common for all four examples of FIGS. 1, 2, 3, and 4, specific additional parameters are included in the messages of each of the variations that trigger different actions or/and additional messages, as described below.

FIG. 1 exemplifies a host-initiated association process in which Host 10 decides the Selected Additional Multicast Address 28 to be used in the layered transmission of multimedia content through several multicast groups, based on the knowledge of the Client Device Capability Information. Initially, Host 10 and Client 12 are in an unassociated state 14. In this case, a Host Association Request message 16 is sent by Host 10 to Client 12 and only contains Host Association Capabilities 18. A Client Association Request message 20 is sent by Client 12 to Host 10 and contains Client Device Capability Information 22 in addition to Client Association Capabilities 24. Client Device Capability Information 22 includes at least one member from the group consisting of display capabilities, video stream format capabilities, video scaling capabilities, video decoding capabilities, audio stream format capabilities, audio decoding capabilities, and user-interface capabilities. Host Association Confirm message 26 sent by Host 10 to Client 12 contains at least one Selected Additional Multicast Address 28 as an additional parameter. At this stage, both Host 10 and Client 12 subscribe Selected Additional Multicast Address 28, besides subscribing a Base Multicast Address 30, as part of the process to Subscribe to the Multicast Addresses 32. The association process ends with Client 12 sending a Client Association Confirm message 34 that includes both Base Multicast Address 30 and Selected Additional Multicast Address 28. Host 10 and Client 12 then transition to the Associated State 36. In this state Host 10 can initiate the transmission of Layered Multimedia Content 38 to Client 12 at any time.

FIG. 2 exemplifies a host-initiated association process in which Client 12 decides the Selected Additional Multicast Address 128 to be used in the layered transmission of multimedia content through several multicast groups, based on its own knowledge of the Client Device Capability Information 122. Initially, Host 10 and Client 12 are in an unassociated state 114. In this case, a Host Association Request Message 116 is sent by Host 10 to Client 12 and includes at least one Additional Multicast Address 140, in addition to Host Association Capabilities 118 and a Base Multicast Address 130. Client 12 decides on at least one Selected Additional Multicast Address 128 among the ones received from Host 10. Client 12 includes the at least one Selected Additional Multicast Address 128, in addition to the Client Capability Information 122 and Base Multicast Address 130 in the Client Association Request message 120 sent to Host 10. Both Host 10 and Client 12 include the at least one Selected Multicast Address 128 along with Base Multicast Address 130 to the process to Subscribe to Multicast Addresses 132. Client 12 sends a Client Association Confirm message 134 to Host 10 containing all the Subscribed Multicast Addresses 132. Host 10 and Client 12 transition to the Associated State 136. In this state Host 10 can initiate the transmission of Layered Multimedia Content 138 to Client at any time.

FIG. 3 exemplifies a client-initiated association process. Initially, Host 10 and Client 12 are in an unassociated state 214. In this case, Client 12 initiates the association process by sending a Client Association Request message 216 to Host 10. This message contains Client Association Information 242 and Client Device Capabilities Information 222. Host 10 confirms the association by sending a Host Association Confirm message 226 that includes at least one Selected Additional Multicast Address 228, besides Selected Association Capabilities 244 and a Base Multicast Address 230. Both Host 10 and Client 12 subscribe to the at least one Selected Multicast Address 228 along with Base Multicast Address 230 during the process to Subscribe Multicast Addresses 232. Client 10 sends a Client Association Confirm message 234 to Host 10 containing all the Subscribed Multicast Addresses 232. Host 10 and Client 12 transition to the Associated State 236. In this state Host 10 can initiate the transmission of Layered Multimedia Content 238 to Client 12 at any time.

FIG. 4 exemplifies a variation of the process to create multiple multicast groups to handle layered transmission of multimedia content. In this case, this process takes places during the Associated State 336, instead of during the association process. The association is a 'basic association' that consist of the following steps. Initially, Host 10 and Client 12 are in an unassociated state 314. Host 10 sends a Host Association Request message 316 indicating its intent to associate with Client 12. This message includes the Host Association Capabilities 318. This message is only sent when the association process is host-initiated. As a response to this message, Client 12 sends a Client Association Request message 320 indicating its intent to associate. This message includes Client Association Capabilities 324. A Host Association Confirm 326 is sent by Host 10 to Client 12 that includes Selected Association Capabilities 344 and a Base Multicast Address 330. Client 12 and Host 10 Subscribe to the Multicast Addresses 346, that is, to the Base Multicast Address 330. Client 12 sends a Client Association Confirm 334 to Host 10. This message contains the Subscribed Multicast Addresses 348. Host 10 and Client 12 transition to the Associated State 336. In this state, Client 12 sends to Host 10 a Client Device Capabilities message 322. Host 10 selects at least one Additional Multicast Address 328, based on Client Device Capability Information 322 and sends an Update Multicast Address 348 containing at least one Additional Multicast Address 328 to client 12. Both Host 10 and Client 12 Subscribe to the Additional Multicast Addresses 332. Client 12 sends an Update Multicast Confirm message 350 that includes the Subscribed Multicast Addresses 332. At this point, Host 10 can initiate the transmission of Layered Multimedia Content 338 to Client 12. In this variation, the association process defines a basic association, and the exchange of Update Multicast Address 348 and Update Multicast Confirm messages 350 occur only when there is a Client 10 with capabilities to support layered transmissions.

Figure 5:
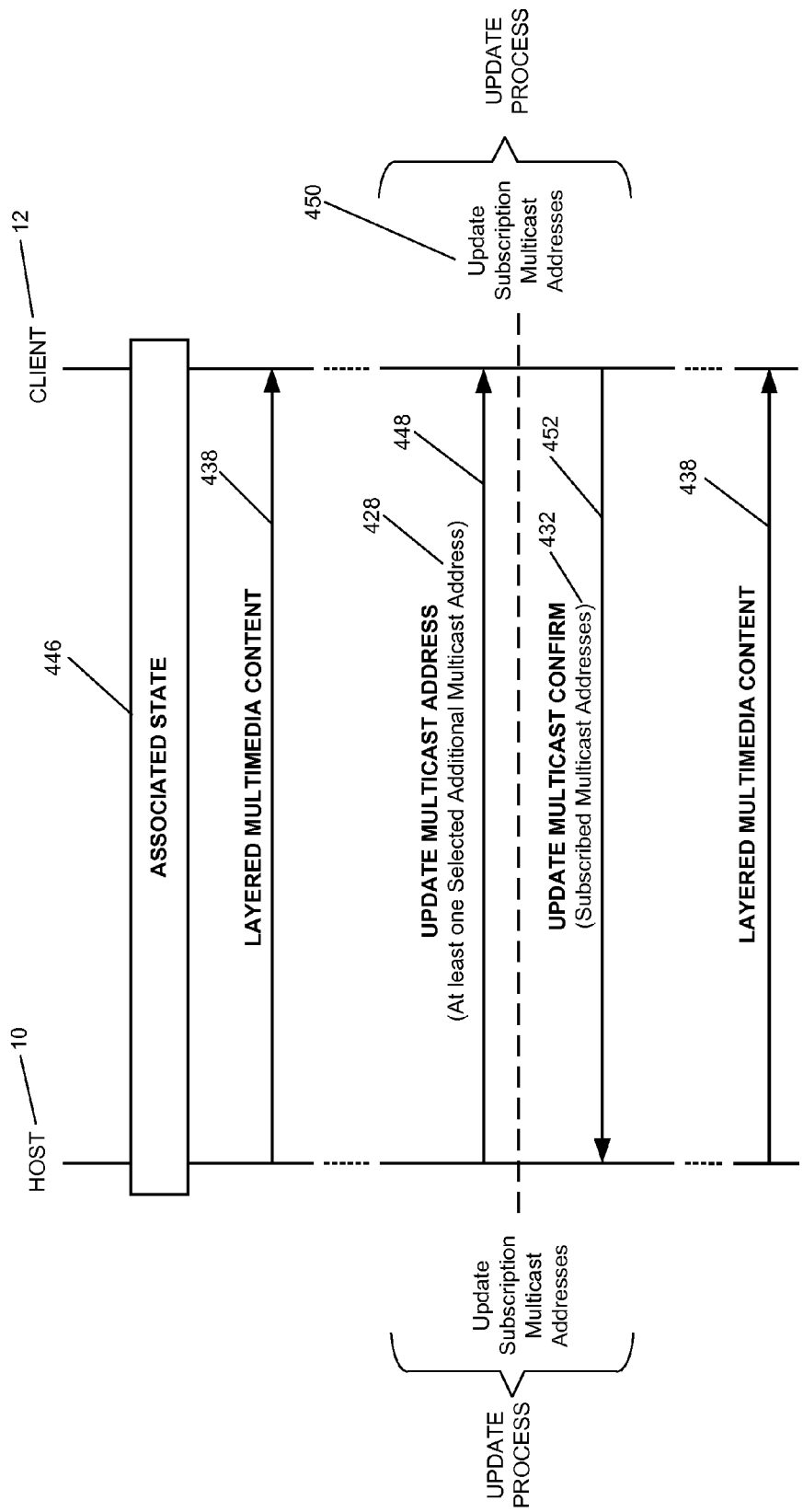
FIG. 5 is a diagram showing a host initiated updating process for the WMDDI association protocol.
Figure 6:
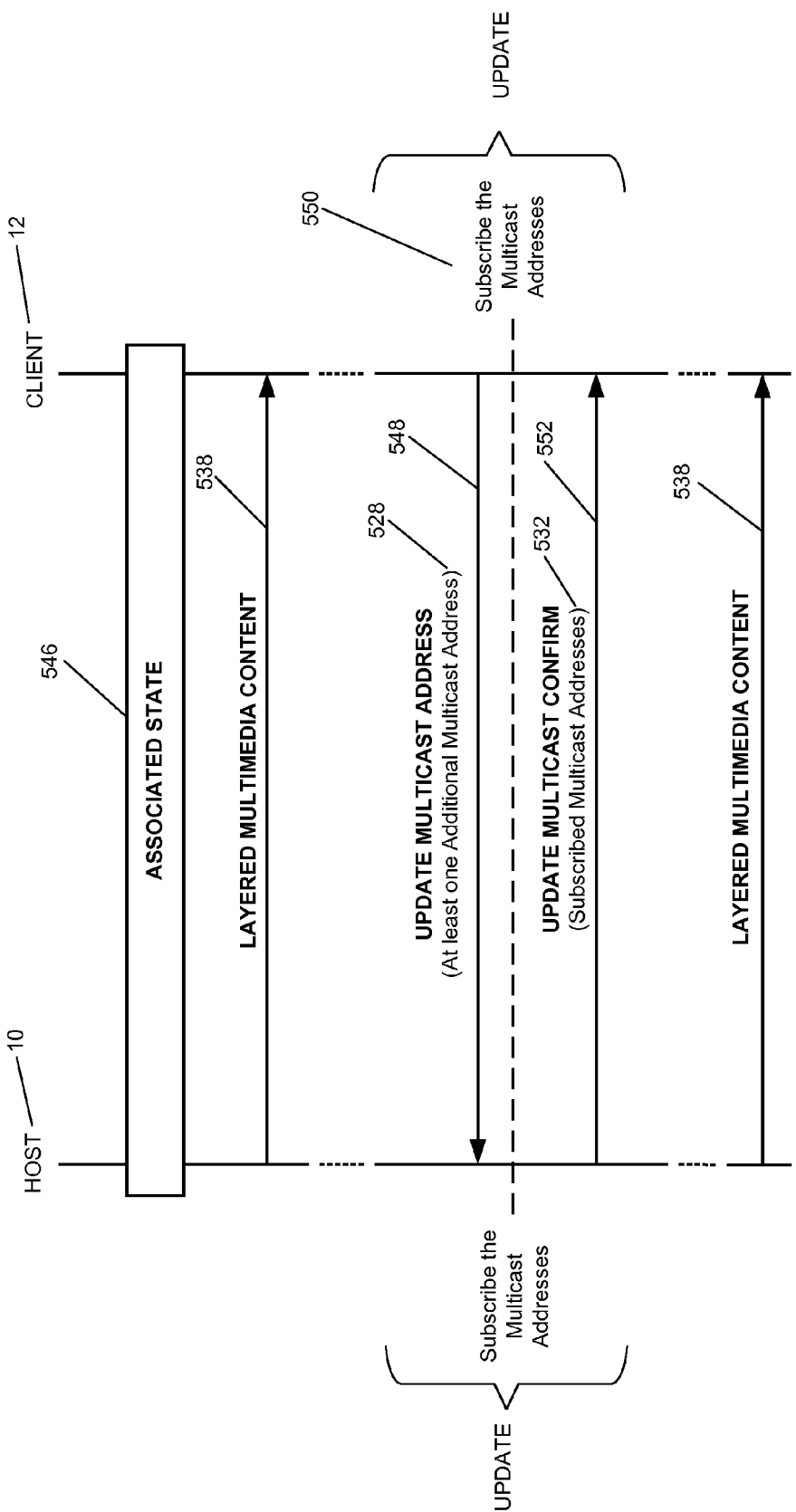
FIG. 6 is a diagram showing a client initiated updating process for the WMDDI association protocol.

FIG. 5 and FIG. 6 exemplify two variations of the process of updating the created multicast groups. The steps of the process are chronologically presented from the top of each figure to the bottom. Although only a single client is shown, several clients can be utilized.

FIG. 5 exemplifies a host-initiated Update Process. Initially, Host 10 and Client 12 are in an associated state 446 and transmission of Layered Multimedia Content is 438 occurring. In this case, Host 10 sends an Update Multicast Address message 448 containing at least one Selected Additional Multicast Address 428. Selected Additional Multicast Address 428 parameter should include the already subscribed multicast addresses and new multicast addresses if selected. Each multicast address should be marked as 'subscribe' or 'unsubscribe'. Both Host 10 and Client 10 accomplish an Update Subscription to Multicast Address 450 by subscribing or unsubscribing to multicast addresses, according to how they are marked. Client 12 sends an Update Multicast Confirm message 452 containing the Subscribed Multicast Addresses 432. At this point the multicast groups have been updated and are ready for the transmission of Layered Multimedia Content 438.

FIG. 6 exemplifies a client-initiated Update Process. Initially, Host 10 and Client 12 are in an associated state 546 and transmission of Layered Multimedia Content is 538 occurring. In this case, Client 12 sends an Update Multicast Address message 548 containing at least one Selected Additional Multicast Address 528. The Selected Additional Multicast Address parameter should include the already subscribed multicast addresses and new multicast addresses if selected. Each multicast address should be marked as 'subscribe' or 'unsubscribe'. Both Host 10 and Client 12 accomplish an Update Subscription to Multicast Address 550 by subscribing or unsubscribing multicast addresses, according to how they are marked. Host 10 sends an Update Multicast Confirm message 552 containing the Subscribed Multicast Addresses 532. At this point the multicast groups have been updated and are ready for the transmission of Layered Multimedia Content 538.

Note that the steps involved in this updating process may take place at any-time during a session. For example: the Client may determine in the middle of the session that it has 'special needs', like layering, and may decide to send a new Client Device Capabilities message to the Host, which triggers the exchange of the Update Multicast Address and Update Multicast Confirm messages.

In a second exemplary situation, in the middle of the session, the Host decides that a multicast addresses needs to be changed, because of a multicast address conflict or due to some other reason, or it may decide to change the data transmission from multicast to unicast or vice versa, the Host will send Update Multicast Address message to the client, which will trigger the Update Multicast Confirm message to be sent by Client.

Figure 7:
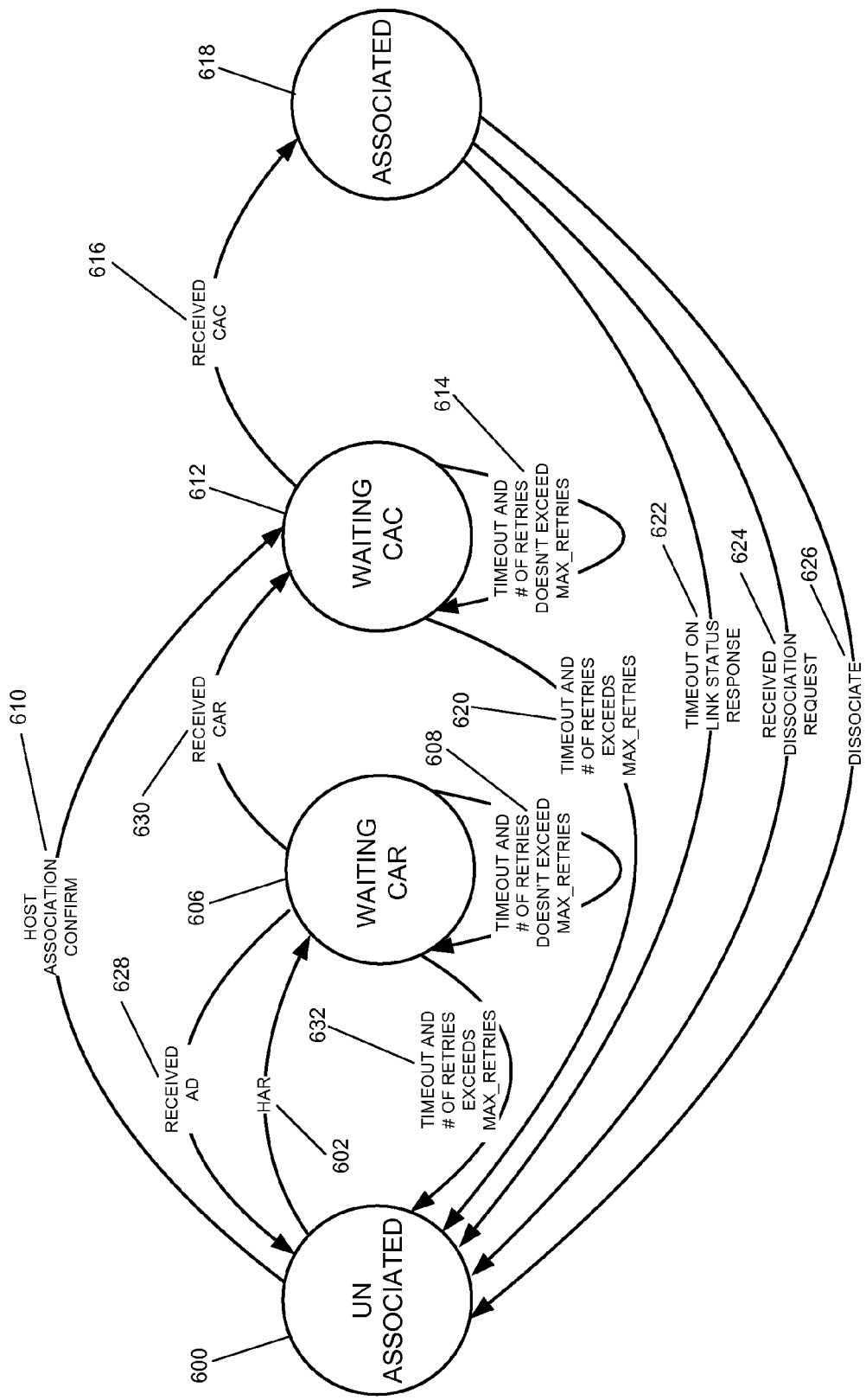
FIG. 7 is a state diagram showing the association/dissociation process for a host.

FIG. 7 is a state diagram showing the association/dissociation process for the host. The host can leave the unassociated state 600 by: (1) sending a Host Association Request (HAR) 602 to a client or, (2) receiving a Client Association Request (CAR) 630 from any client. In case (1), it enters the Waiting Client Association Request (WCAR) state 606, that is, a state in which the host initiates a timer while waiting to receive the CAR 606; this timer expires after a certain 'Timeout' and can be reinitiated up to a maximum of 'MAX_RETRIES' 608. Once the CAR is received 630 it enters into the Waiting Client Association Confirm (WCAC) state 612. If the timeout expires MAX_RETRIES times 632 and the CAR message has not been received, the host returns to the unassociated state 600 via an Association Denied (AD) message 628; otherwise it sends a host association confirm 610 and enters the WCAC 612.

In case (2), it directly enters the WCAC 612. In the WCAC 612 state, the host initiates a timer while waiting to receive the client association confirm WCAC 612; this timer expires after a certain 'Timeout' and can be reinitiated up to a maximum of 'MAX_RETRIES'. If the timeout and number of retries doesn't exceed MAX_RETRIES 614, Client Association Confirm (CAC) is received 616 and the host enters the association state 618. If the Timeout expires MAX_RETRIES times 620 and the CAC message has not been received, the host returns to the unassociated state 600. Otherwise, the host enters the associated state 618.

A host can leave the associated state 618 with a client in any of the following cases: (a) The host does not received a client link status message within the negotiated link status period 622, (b) the host receives a request to dissociate from the client 624, and (c) the host decides to dissociate and sends a dissociation message 626 to the client.

Figure 8:
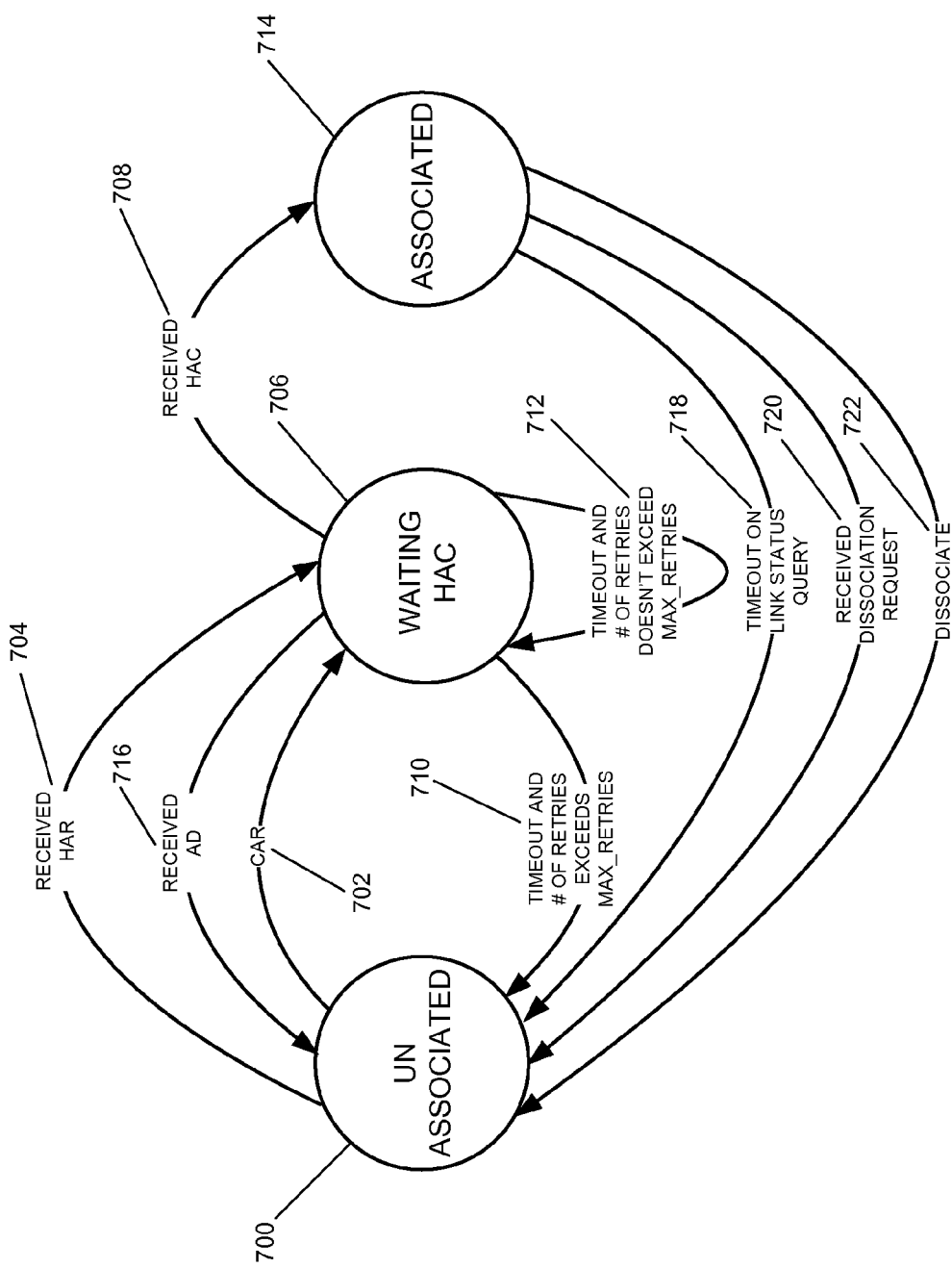
FIG. 8 is a state diagram showing the association/dissociation process for a client.

FIG. 8 is a state diagram showing the association/dissociation process for a client. A client can leave the unassociated state 700 by either sending a Client Association Request (CAR) 702 to a host or receiving a Host Association Request (HAR) from a host. In both cases, the client enters the Waiting Host Association Confirm (WHAC) 706. In the WHAC state 706, the client initiates a timer while waiting to receive the host association confirm HAC 708; this timer expires after a certain timeout and can be reinitiated up to a maximum of 'MAX_RETRIES'. If the Timeout expires MAX_RETRIES times 710 and the HAC message has not been received, an association denied is sent 716 and the client returns to the unassociated state 700. If the HAC is received 708 and the timeout has not expired and doesn't exceed MAX_RETRIES 712, the client enters the associated state 714. A client can leave the associated state 714 with a host in any of the following cases: (a) the client does not receive a host link status message within the negotiated link status period 718, (b) the client receives a request to dissociate 720 from the host, and (c) the client decides to dissociate and sends a dissociation message 722 to the host.

The mechanisms described above provide a protocol for the exchange and update of capabilities and multicast addresses for layered multicast transmission applications. The presently claimed invention solves not only the problem of interoperating devices with different capabilities in a wireless system, but also provides an efficient transmission mechanism, credited to the use of different multicast addresses mapped to different layers of a bitstream. Transmitting to a reduced number of multicast addresses is more efficient than transmitting to several clients unicast.

The protocol also provides mechanisms to adapt to changes in the system/channel by updating capabilities, joining/releasing multicast addresses and monitoring the link quality. This may be useful for QoS adaptation. For example, deterioration in the channel due to bandwidth constraints may be mitigated by removing the use of enhancement layers mapped to a certain multicast address. If, at some point, the client has more processing resources available it may update its capabilities and inform the host, who may decide to update the multicast groups this client belongs to, and from now on, the client will be able to receive/process enhancement layers (better quality).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the presently claimed invention.

The various illustrative logical blocks, modules, and circuits described in connection with the aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of non-transitory storage medium known in the art. An exemplary non-transitory storage medium is coupled to the processor such the processor can read information from, and write information to, the non-transitory storage medium. In the alternative, the non-transitory storage medium may be integral to the processor. The processor and the non-transitory storage medium may reside in an ASIC. The ASIC may reside in a user terminal. In the alternative, the processor and the non-transitory storage medium may reside as discrete components in a user terminal.

The previous description of the disclosed aspects is provided to enable any person skilled in the art to make or use the presently claimed invention. Various modifications to these aspects will be readily apparent to those skilled in the art, and the generic principles defined herein may be applied to other aspects without departing from the spirit or scope of the claimed invention. Thus, the presently claimed invention is not intended to be limited to the aspects shown herein, but is to be accorded the widest scope consistent with the principles and novel features disclosed herein.

The invention claimed is:

1. A method for establishing an association for a transmission of layered multimedia content to at least one multicast group in a communication system, the method comprising the steps of:
   a) providing an intent to associate between a host and at least one client, the intent to associate comprising host and client association capabilities and client device capability information, the client device capability information comprising client display capabilities and client decoding capabilities;
   b) sending an association confirm message by the host comprising selected association capabilities, a base multicast address, and at least one selected additional multicast address for additional layers of the multicast content according to the client device capability information;
   c) subscribing to the base multicast address and the at least one selected additional multicast address by the host and at least one client;
   d) sending an association confirm message by the at least one client comprising the subscribed multicast addresses; and
   e) transmitting the layered multimedia content to the at least one multicast group via the at least one selected additional multicast address.

2. The method of claim 1 wherein the association capabilities comprise at least one member from the group consisting of security attributes, multicast attributes, link status periodicity and association parameters.

3. The method of claim 1 wherein the client device capability information comprises at least one member from the group consisting of display capabilities, video stream format capabilities, video scaling capabilities, video decoding capabilities, audio stream format capabilities, audio decoding capabilities, and user-interface capabilities.

4. The method of claim 1 where the intent to associate is initiated by the host and comprises the steps of:
   sending an association request message by the host comprising
   the host association capabilities; and
   sending an association request message by the at least one client
   comprising the client association capabilities and client device capability information.

5. The method of claim 4 where the association request message sent by the host comprises the base multicast address and the at least one additional multicast address for multilayer content, and the association request message sent by the at least one client comprises a selected set of multicast addresses among the at least one additional multicast address sent by the host.

6. The method of claim 1 where the intent to associate is initiated by the at least one client and comprises sending an association request message by the client comprising the client association capabilities and the client device capability information.

7. The method of claim 1 further comprises the step of updating the association.

8. The method of claim 7 wherein the step of updating is initiated by the host and comprises the steps of:
   sending an update multicast address message by the host to the at least one client and comprising at least one host selected additional multicast address; and
   sending an update multicast confirm message by the at least one client to the host confirming the subscription to the at least one host selected additional multicast address.

9. The method of claim 8 wherein the step of updating is triggered by the at least one client by sending an update capabilities message comprising an update on the client device capability information.

10. The method of claim 7 wherein the step of updating is initiated by the at least one client and comprises the steps of:
    sending an update multicast address message by the at least one client to the host and comprises the at least one additional multicast address; and
    sending an update multicast confirm message by the host to the at least one client confirming the subscription to the at least one additional multicast address.

11. The method of claim 7 wherein the step of updating comprises at least one member from the group consisting of updating the base multicast address and updating the at least one selected additional multicast address.

12. A system for establishing an association for a transmission of layered multimedia content to at least one multicast group in a communication system comprising:

a processor;

means for providing an intent to associate between a host and at least one client in the processor, the intent to associate comprising host and client association capabilities and client device capability information, the client device capability information comprising client display capabilities and client decoding capabilities;

means for sending an association confirm message by the host in the processor comprising selected association capabilities, a base multicast address, and at least one selected additional multicast address for additional layers of the multicast content according to the client device capability information;

means for subscribing to the base multicast address and the at least one selected additional multicast address by the host and at least one client in the processor;

means for sending an association confirm message by the at least one client in the processor comprising the subscribed to multicast addresses; and means for transmitting the layered multimedia content to the at least one multicast group via the at least one selected additional multicast address in the processor.

13. The system of claim 12 wherein the association capabilities comprise at least one member from the group consisting of security attributes, multicast attributes, link status periodicity, capability parameters and association parameters.

14. The system of claim 12 wherein the client device capability information comprises at least one member from the group consisting of display capabilities, video stream format capabilities, video scaling capabilities, video decoding capabilities, audio stream format capabilities, audio decoding capabilities, and user-interface capabilities.

15. The system of claim 12 where the intent to associate is initiated by the host and comprises:

means for sending an association request message by the host in the processor comprising the host association capabilities; and means for sending an association request message by the at least one client in the processor comprising the client association capabilities and client device capability information.

16. The system of claim 15 where the association request message sent by the host and comprises the base multicast address and the at least one additional multicast address for multilayer content, and the association request message sent by the at least one client, comprising a selected set of multicast addresses among the at least one additional multicast address sent by the host.

17. The system of claim 12 where the intent to associate is initiated by the at least one client and comprises a means for sending an association request message by the client in the processor and comprises the client association capabilities and the client device capability information.

18. The system of claim 12 further comprises a means for updating the association in the processor.

19. The system of claim 18 wherein the means for updating is initiated by the host and comprises:

means for sending an update multicast address message by the host to the at least one client in the processor comprising at least one host selected additional multicast address; and means for sending an update multicast confirm message by the at least one client to the host in the processor confirming the subscription to the at least one host selected additional multicast address.

20. The system of claim 19 wherein the means for updating is triggered by the at least one client by sending an update capabilities message comprising an update on the client device capability information.

21. The system of claim 18 wherein the means for updating is initiated by the at least one client and comprises:

means for sending an update multicast address message by the at least one client to the host in the processor comprising the at least one additional multicast address; and means for sending an update multicast confirm message by the host to the at least one client confirming the subscription to the at least one additional multicast address.

22. The system of claim 18 wherein the means for updating comprises at least one member from the group consisting of a means for updating the base multicast address and a means for updating the at least one selected additional multicast address.

23. A non-transitory storage media comprising program instructions which are computer-executable to implement establishment of an association for a transmission of layered multimedia content to at least one multicast group in a communication system, the storage media comprising:

program instructions that cause an intent to associate to be provided between a host and at least one client, the intent to associate comprising host and client association capabilities and client device capability information, the client device capability information comprises client display capabilities and client decoding capabilities;

program instructions that cause an association confirm message to be sent by the host comprise selected association capabilities, a base multicast address, and at least one selected additional multicast address for additional layers of the multicast content according to the client device capability information;

program instructions that cause a subscription to the base multicast address and the at least one selected additional multicast address by the host and at least one client;

program instructions that cause an association confirm message to be sent by the at least one client comprising the subscribed to multicast addresses; and program instructions that cause the layered multimedia content to be transmitted to the at least one multicast group via the at least one selected additional multicast address.

24. The non-transitory storage media of claim 23 wherein the association capabilities comprise at least one member from the group consisting of security attributes, multicast attributes, link status periodicity, capability parameters and association parameters.

25. The non-transitory storage media of claim 23 wherein the client device capability information comprises at least one member from the group consisting of display capabilities, video stream format capabilities, video scaling capabilities, video decoding capabilities, audio stream format capabilities, audio decoding capabilities, and user-interface capabilities.

26. The non-transitory storage media of claim 23 wherein the program instructions to provide the intent to associate are initiated by the host and comprise:

program instructions that cause an association request message to be sent by the host comprising the host association capabilities; and program instructions that cause an association request message to be sent by the at least one client comprising the client association capabilities and client device capability information.

27. The non-transitory storage media of claim 26 where the association request message sent by the host comprises the base multicast address and the at least one additional multicast address for multilayer content, and the association request message sent by the at least one client comprising a selected set of multicast addresses among the at least one additional multicast address sent by the host.

28. The non-transitory storage media of claim 23 where the intent to associate is initiated by the at least one client comprises program instructions that cause an association request message to be sent by the client and comprising the client association capabilities and the client device capability information.

29. The non-transitory storage media of claim 23 further comprises program instructions to update the association.

30. The non-transitory storage media of claim 29 wherein program instructions to update are initiated by the host and comprise:
   program instructions that cause the host to send an update multicast address message to the at least one client comprising at least one host selected additional multicast address; and
   program instructions that cause the at least one client to send an update multicast confirm message to the host confirming the subscription to the at least one host selected additional multicast address.

31. The non-transitory storage media of claim 30 wherein the program instructions to update are triggered by the at least one client by program instructions that cause an update capabilities message comprising an update on the client device capability information to be sent.

32. The non-transitory storage media of claim 29 wherein the program instructions to update are initiated by the at least one client and comprises:
   program instructions that cause an update multicast address message to be sent by the at least one client to the host comprising the at least one additional multicast address; and
   program instructions that cause an update multicast confirm message to be sent by the host to the at least one client confirming the subscription to the at least one additional multicast address.

33. The non-transitory storage media of claim 29 wherein the program instructions to update comprise at least one member from the group consisting of program instructions to update the base multicast address and program instructions to update the at least one selected additional multicast address.

34. A method for establishing and updating an association for a transmission of layered multimedia content to at least one multicast group in a communication system, the method comprising the steps of:
   a) providing an intent to associate between a host and at least one client, the intent to associate comprising association capabilities;
   b) sending an association confirmation message by the host, comprising selected association capabilities and a base multicast address;
   c) subscribing to the base multicast address by the host and the at least one client;
   d) sending an association confirmation message by the at least one client comprising the subscribed multicast address;
   e) sending client device capability information from the at least one client, the client device capability information comprising client display capabilities and client decoding capabilities;
   f) sending an update multicast address message by the host comprising at least one additional multicast address for the layers of the multicast content according to the client device capability information;
   g) subscribing to the at least one additional multicast address by the host and at least one client;
   h) sending an update multicast confirm message by the at least one client to the host, comprising the subscribed multicast addresses; and
   i) transmitting the layered multimedia content to the at least one multicast group via the selected at least one additional multicast address.

35. The method of claim 34 wherein the association capabilities comprises at least one member from the group consisting of security attributes, multicast attributes, link status periodicity and association parameters.

36. The method of claim 34 wherein the client device capability information comprises at least one member from the group consisting of display capabilities, video stream format capabilities, video scaling capabilities, video decoding capabilities, audio stream format capabilities, audio decoding capabilities, and user-interface capabilities.

37. The method of claim 34 wherein the intent to associate is initiated by the client.

38. The method of claim 34 wherein the intent to associate is initiated by the host.

39. The method of claim 34 further comprising the step of updating the association.

40. The method of claim 39 wherein the step of updating is initiated by the host and comprises the steps of:
   sending an update multicast address message by the host to the at least one client comprising at least one host selected additional multicast address; and
   sending an update multicast confirm message by the at least one client to the host confirming the subscription to the at least one host selected additional multicast address.

41. The method of claim 39 wherein the step of updating is triggered by the at least one client by sending an update capabilities message comprising an update on the client device capability information.

42. The method of claim 39 wherein the step of updating is initiated by the client and comprises the steps of:
   sending an update multicast address message by the at least one client to the host comprising the at least one additional multicast address; and
   sending an update multicast confirm message by the host to the at least one client confirming the subscription to the at least one additional multicast address.

43. The method of claim 39 wherein the step of updating comprises at least one member from the group consisting of updating the base multicast address and updating the at least one host selected additional multicast address.

44. A system for establishing and updating an association for a transmission of layered multimedia content to at least one multicast group in a communication system comprising:
   a processor;
   means for providing an intent to associate between a host and at least one client in the processor, the intent to associate comprising association capabilities;
   means for sending an association confirmation message by the host in the processor, comprising the selected association capabilities and a base multicast address;
   means for subscribing to the base multicast address by the host and at least one client in the processor;
   means for sending an association confirmation message by the at least one client in the processor comprising the subscribed multicast address
   means for sending client device capability information from the at least one client to the host in the processor, the client device capability information comprises client display capabilities and client decoding capabilities;

means for sending an update multicast address message by the host in the processor, comprising at least one additional multicast address for the layers of the multicast content according to the client device capability information;

means for subscribing to the base multicast address and the selected at least one additional multicast address by the host and at least one client in the processor;

means for sending an update multicast confirm message by the at least one client in the processor, comprising the subscribed multicast addresses; and means for transmitting the layered multimedia content to the at least one multicast group in the processor via the selected at least one additional multicast address.

45. The system of claim 44 wherein the association capabilities comprise at least one member from the group consisting of security attributes, multicast attributes, link status periodicity and association parameters.

46. The system of claim 44 wherein the client device capability information comprises at least one member from the group consisting of display capabilities, video stream format capabilities, video scaling capabilities, video decoding capabilities, audio stream format capabilities, audio decoding capabilities, and user-interface capabilities.

47. The system of claim 44 wherein the means for providing the intent to associate is initiated by the client.

48. The system of claim 44 wherein the means for providing the intent to associate is initiated by the host.

49. The system of claim 44 further comprises a means for updating the association in the processor.

50. The system of claim 49 wherein the means for updating is initiated by the host and comprises:

means for sending an update multicast address message by the host to the at least one client in the processor comprising at least one host selected additional multicast address; and means for sending an update multicast confirm message by the at least one client to the host in the processor confirming the subscription to the at least one host selected additional multicast address.

51. The system of claim 49 wherein the means for updating is triggered by the at least one client by a means for sending an update capabilities message comprising an update on the client device capability information.

52. The system of claim 49 wherein the means for updating is initiated by the client and comprises:

means for sending an update multicast address message by the at least one client to the host in the processor comprising the at least one additional multicast address; and means for sending an update multicast confirm message by the host to the at least one client confirming the subscription to the at least one additional multicast address.

53. The system of claim 49 wherein the means for updating comprises at least one member from the group consisting of a means for updating the base multicast address and a means for updating the at least one host selected additional multicast address.

54. A non-transitory storage media comprising program instructions which are computer-executable to implement establishment and update of an association for a transmission of layered multimedia content to at least one multicast group in a communication system, the storage media comprising:

program instructions that cause an intent to associate to be provided between a host and at least one client, the intent to associate comprising association capabilities;

program instructions that cause an association confirmation message to be sent by the host, comprising the selected association capabilities and a base multicast address;

program instructions that cause the base multicast address to be subscribed by the host and at least one client;

program instructions that cause an association confirmation message to be sent by the at least one client comprising the subscribed multicast address;

program instructions that cause client device capability information to be sent from the at least one client to be sent, the client device capability information comprising client display capabilities and client decoding capabilities;

program instructions that cause an update multicast address message to be sent by the host comprising at least one additional multicast address for the layers of the;

program instructions that cause the selected at least one additional multicast address to be subscribed to by the host and at least one client;

program instructions that cause an update multicast confirm message to be sent by the client, comprising the subscribed to multicast addresses; and program instructions that cause the layered multimedia content to be transmitted to the at least one multicast group via the selected at least one additional multicast address.

55. The non-transitory storage media of claim 54 wherein the association capabilities comprise at least one member from the group consisting of security attributes, multicast attributes, link status periodicity and association parameters.

56. The non-transitory storage media of claim 54 wherein the client device capability information comprises at least one member from the group consisting of display capabilities, video stream format capabilities, video scaling capabilities, video decoding capabilities, audio stream format capabilities, audio decoding capabilities and user-interface capabilities.

57. The non-transitory storage media of claim 54 wherein the program instructions that cause the intent to associate are initiated by the client.

58. The non-transitory storage media of claim 54 wherein the program instructions that cause the intent to associate is initiated by the host.

59. The non-transitory storage media of claim 54 further comprises program instructions that cause an update of the association.

60. The non-transitory storage media of claim 59 wherein the program instructions that cause the update are initiated by the host and comprise:

program instructions that cause an update multicast address message to be sent by the host to the at least one client comprising at least one host selected additional multicast address; and program instructions that cause an update multicast confirm message to be sent by the at least one client to the host confirming the subscription to the at least one host selected additional multicast address.

61. The non-transitory storage media of claim 59 wherein the program instructions that cause the update are triggered by the at least one client by program instructions that cause an update capabilities message comprising an update on the client device capability information to be sent.

62. The non-transitory storage media of claim 59 wherein the program instructions that cause the update are initiated by the client and comprise:

program instructions that cause an update multicast address message to be sent by the at least one client to the host comprising the at least one additional multicast address; and program instructions that cause an update multicast confirm message to be sent by the host to the at least one client confirming the subscription to the at least one additional multicast address.

63. The non-transitory storage media of claim 59 wherein the program instructions that cause the update comprises at least one member from the group consisting of updating the base multicast address and updating the at least one host selected additional multicast address.

* * * * *